United States Patent
Kojima et al.

(10) Patent No.: US 8,031,297 B2
(45) Date of Patent: *Oct. 4, 2011

(54) COLOR FILTER AND LIQUID CRYSTAL DISPLAY DEVICE

(75) Inventors: Hideyuki Kojima, Shiga (JP); Tetsuo Yamashita, Kyoto (JP); Shigetaka Kasai, Tokyo (JP); Ikumi Hada, Shiga (JP); Masahiro Yoshioka, Shiga (JP); Harushi Nonaka, Shiga (JP); Hiroyuki Sasaki, Shiga-gun (JP)

(73) Assignee: Toray Industries, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/294,375

(22) Filed: Dec. 6, 2005

(65) Prior Publication Data

US 2006/0088775 A1    Apr. 27, 2006

Related U.S. Application Data

(63) Continuation of application No. 10/158,856, filed on Jun. 3, 2002, now Pat. No. 7,068,334.

(30) Foreign Application Priority Data

Jun. 4, 2001 (JP) .................. 2001-167810
Jul. 3, 2001 (JP) .................. 2001-202045

(51) Int. Cl.
*G02F 1/1335*  (2006.01)
(52) U.S. Cl. ........ 349/106; 349/114; 349/155; 349/156; 349/157
(58) Field of Classification Search .......... 349/106, 349/114, 129; 430/7

See application file for complete search history.

(56) References Cited

U.S. PATENT DOCUMENTS

| | | | |
|---|---|---|---|
| 5,169,672 A | 12/1992 | Harima et al. | |
| 5,658,697 A * | 8/1997 | Lin | 430/7 |
| 6,215,538 B1 | 4/2001 | Marutaki et al. | |
| 6,280,890 B1 * | 8/2001 | Sawamura et al. | 430/7 |
| 6,295,106 B1 | 9/2001 | Fukuzawa et al. | |
| 6,452,654 B2 | 9/2002 | Kubo et al. | |
| 6,517,630 B1 * | 2/2003 | Grandidier et al. | 106/498 |
| 6,542,209 B2 * | 4/2003 | Kim et al. | 349/106 |
| 6,580,480 B2 * | 6/2003 | Baek et al. | 349/114 |
| 6,627,364 B2 * | 9/2003 | Kiguchi et al. | 430/7 |
| 6,654,090 B1 * | 11/2003 | Kim et al. | 349/129 |
| 6,836,308 B2 * | 12/2004 | Sawasaki et al. | 349/129 |
| 6,909,479 B2 * | 6/2005 | Iijima | 349/109 |
| 6,999,139 B2 * | 2/2006 | Kim et al. | 349/106 |
| 7,002,659 B1 * | 2/2006 | Yamazaki et al. | 349/155 |
| 7,068,334 B2 * | 6/2006 | Kojima et al. | 349/106 |
| 2001/0026347 A1 * | 10/2001 | Sawasaki et al. | 349/156 |

(Continued)

FOREIGN PATENT DOCUMENTS

EP    0893737    1/1999

(Continued)

*Primary Examiner* — (Nancy) Thanh-Nhan P Nguyen
(74) *Attorney, Agent, or Firm* — Pillsbury Winthrop Shaw Pittman LLP

(57) ABSTRACT

The present invention provides a color filter comprising a transmission area and reflection area in which at least one color pixel of red, green and blue pixels is formed of the same material, wherein a transparent area having no color layer is formed in a part of the reflection area, at least one sub-area is formed in the transparent area, and the size of the sub-area is 20 μm or more and 2,000 μm or less. The present invention also provides a liquid crystal display for both transmission display and reflection display with a cheap manufacturing cost, wherein the difference of chromaticity between the transmission display and reflection display is small, and the surface of the transmission area and reflection area have small step heights.

15 Claims, 6 Drawing Sheets

U.S. PATENT DOCUMENTS

| | | |
|---|---|---|
| 2002/0008836 A1* | 1/2002 | Shibahara .................. 349/155 |
| 2002/0149728 A1* | 10/2002 | Ogishima et al. ............ 349/129 |
| 2002/0154257 A1 | 10/2002 | Iijima |

FOREIGN PATENT DOCUMENTS

| | | |
|---|---|---|
| EP | 1109053 | 6/2001 |
| JP | 61-230101 | 10/1986 |
| JP | 8-286178 | 11/1996 |
| JP | 11-183891 | 7/1999 |
| JP | 11-183892 | 7/1999 |
| JP | 11-217514 | 8/1999 |
| JP | 2001-33778 | 2/2001 |

* cited by examiner $$S = y \times (x - y) + \pi \times (y / 2)^2$$

COLOR FILTER AND LIQUID CRYSTAL DISPLAY DEVICE

REFERENCE TO RELATED APPLICATION

This application is a continuation application of U.S. application Ser. No. 10/158,856, filed on Jun. 3, 2002, the content of which is hereby incorporated herein by reference.

BACKGROUND OF THE INVENTION

1. Field of the Invention

The present invention relates to a color filter to be used for a liquid crystal display that may be used for both a transmission type and reflection type display.

2. Description of the Related Art

A liquid crystal display is used today for various uses such as a notebook-sized personal computer, portable type information terminal, desk-top monitor and digital camera by taking advantage of its characteristics such as a lightweight and thin size, and low power consumption. The liquid crystal display using a backlight is required to improve energy efficiency of the backlight for reducing power consumption as well as to enhance transmittance of the color filter. While the transmittance of the color filter is advancing year after year, power consumption cannot be expected to be largely decreased by improving transmittance of the color filter.

Accordingly, a reflection type liquid crystal display has been developed in recent years in order to eliminate the need of the backlight that consumes a large amount of electric power. Released is a reflection type liquid crystal display that has realized an energy consumption as small as 1/7 of energy consumption of a transmission type liquid crystal display ("Flat-Panel Display", Supplement Edition of Nikkei Micro-Device, 1998, p 126).

Although it is advantages of the reflection type display over the transmission type display that power consumption is small and outdoor viewing is excellent, the display panel becomes dark when a sufficient intensity of light is not ensured in the environment accompanying extremely poor viewing. Accordingly, a proposed liquid crystal display designed for improving viewing even in a dark environment comprises (1) a partially transmission type and partially reflection type liquid crystal display having a cut portion in a part of a reflection film together with providing a backlight (based on a so-called semi-transmission semi-reflection type display method; see as a reference Fine Process Technology Japan '99, Textbook of Specialized Technology Seminar), and (2) a display device having a front-light.

FIG. 3 is a schematic drawing of a conventional semi-transmission type liquid crystal display. FIG. 3 shows a transmission mode that displays by taking advantage of a backlight source 3, and a reflection mode that displays by taking advantage of a natural light. This type of the color liquid crystal display comprises a transmission area 8 and reflection area 7, and the color in the transmission area is displayed for transmission display while the color in the reflection area is displayed for reflection display. While the backlight passes through the transmission area of the color filter once (denoted by an arrow 6) for transmission display, the natural light passes through the reflection area of the color filter twice, or as an incident light 4 and a reflecting light 5 reflected with a reflection layer 2. In other words, since the number of passage through the color filter is different between the transmission type display and reflection type display, the displayed color density, or the color purity and brightness are largely different between the transmission type display and reflection type display when the same color material 1 is used for the transmission area and reflection area. Since the light sources are a backlight 3 and natural light 4, respectively, in the transmission type display and in the reflection type display, the color purity as well as the color tone are different between the transmission type display and reflection type display.

It may be contemplated to constitute the transmission area and reflection area with different color materials 1 and 1', respectively, as shown in FIG. 5 in order to obtain the same display color in both the transmission area and reflection area. However, the manufacturing cost of the liquid crystal display seems to be increased by using a currently prevailing photolithographic method since six times of coating using three colors are required.

Japanese Unexamined Patent Application Publication No. 2001-33778 discloses to form a spacer in the reflection area for changing the thickness of the color layers between the transmission area and reflection area, in order to make the color density (color repeatability) equal between the transmission area and reflection area. FIG. 6 is a schematic cross section of a color filter for a semi-transmission type liquid crystal display having a construction known in the art. A transparent resin layer 14 is formed in the reflection area 7, and the color layer 1 of the reflection area 7 is thinner than the color layer 1 of the transmission area 8. However, changes of the color tone that arise due to the difference of the light sources, or the backlight in the transmission display and natural light in the reflection display, cannot be corrected merely by changing the thickness of the color materials. In other words, while large differences in the color purity and brightness may be eliminated by thinning the thickness of the color layer of the reflection area 7, the monochromatic color tone of each red, green and blue color in the reflection type display becomes different from that in the transmission type display, thereby giving a disharmony in vision of the reflection type display and transmission type display.

In FIGS. 3, 5 and 6, the reference numeral 9 denotes a pixel area.

A light-hole type color filter has been proposed for solving the problems as hitherto described and for cheaply providing a color filter having less differences of the brightness and color tones between the transmission type display and reflection type display, wherein a transparent area is provided in the reflection area as disclosed in Japanese Unexamined Patent Application Publication No. 2000-111902. Since only one time of processing is necessary for one color, it may be manufactured by the same number of manufacturing steps as in the conventional color filters, thereby avoiding the manufacturing cost from being increased.

FIG. 1 shows the structure (cross sectional structure) of the light-hole type color filter. A transmission area 8 and reflection area 7 are formed in a pixel for each one color in this color filter. Both areas may be present in one pixel, or either one of them may be present in one pixel and the other area may be present in a different pixel to form the both areas in a plurality of pixels. The substrate on which a reflection layer 2 is formed may be either a substrate at the color filter side, or a substrate opposed to the color filter. The area in which the reflection film 2 is formed serves as a reflection area 7 within the pixel area 9 when the reflection film is formed at the color filter side, and the area having no reflection film 2 within the pixel area 9 serves as a transmission area 8. When the reflection film is formed on a substrate opposed to the color filter, on the other hand, the pixel area corresponding to the reflection film forming area of the substrate serves as the reflection area 7, while the pixel area corresponding to the area where the reflection film 2 is not formed on the substrate serves as the transmission area 8. The reflection area 7 contains a transparent area 10 and colored area 11. The transparent area 10 actually means an area where no color layer 1 is formed.

However, it is a problem of the light-hole type color filter that a step height is formed on the surface of the color filter as a result of providing a transparent area having no color layer. One of the fundamental characteristics that seriously affect the display performance of the liquid crystal display is a cell gap. Since the step height on the surface of the color filter is directly reflected on the change of the cell gap, it is preferable that the step height is as small as possible. In addition, since a larger step height may adversely affect planarity of the color filter to arise inconvenience for alignment treatment of the layer, defective display may appear when the filter is integrated into a liquid crystal panel.

The step height between the color area and transparent area in the reflection area may be planarized to a certain extent by coating an overcoat layer. However, when a pigment comprising a quinacridone derivative represented by pigment red 209 as disclosed in Japanese Unexamined Patent Application Publication No. 2000-249824 is used as a principal pigment, the step height increases due to the increased thickness of the pixel in the effort for improving the color purity and color characteristics of the color filter, making it difficult to fill the step even by coating the overcoat.

Control of dimensions of the transparent area is quite important in the light-hole type color filter. Therefore, poor processing performance results in low yield of the filter, thereby increasing the manufacturing cost of the color filter.

SUMMARY OF THE INVENTION

Accordingly, it is an object of the present invention for solving the foregoing problems to cheaply provide a color filter having small differences of brightness and color between the transmittance display and reflection display while having a small step height.

The present invention for attaining the foregoing object provides a color filter having a transmission area and reflection area in which at least one color pixel among red, green and blue pixels is formed using the same material, wherein a transparent area without any color layer is formed at a part of the reflection area, the transparent area comprises at least one sub-area, and the size of the sub-area is 20 $\mu m^2$ or more and 2000 $\mu m^2$ or less.

Preferably, the shape of the sub-area in the color filter is either a circle, a square with a side length of 5 μm or more, or a rectangle with a shorter side length of 5 μm or more.

DESCRIPTION OF THE PREFERRED EMBODIMENTS

Figure 1:
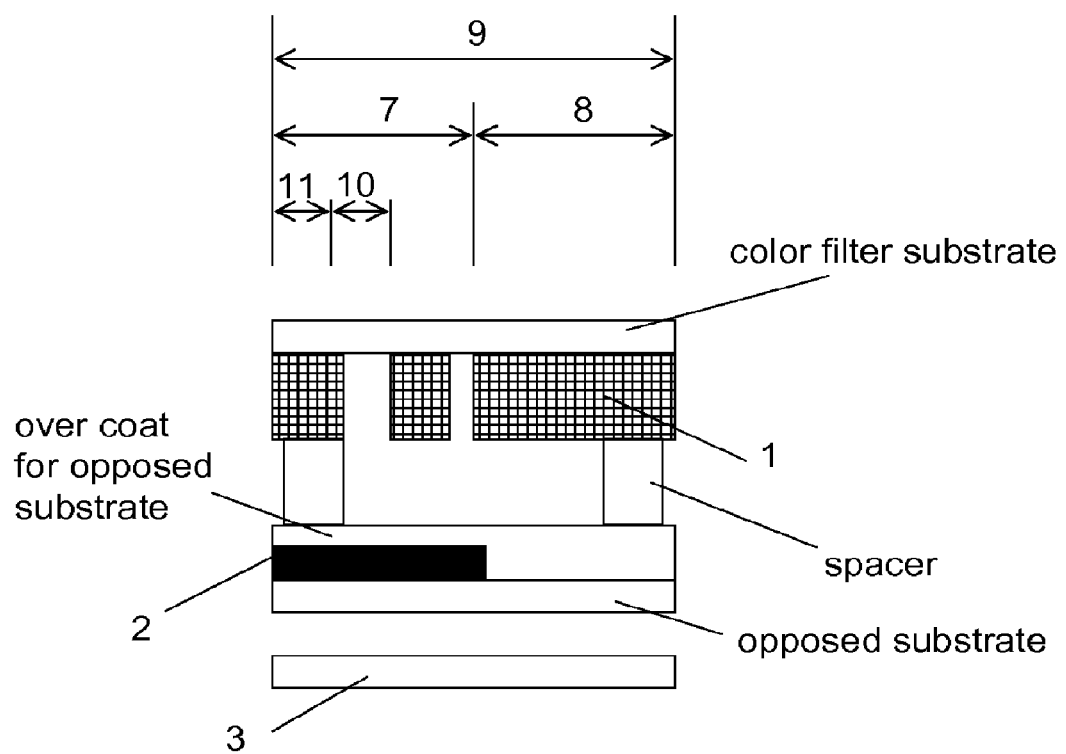
FIG. 1 shows an example of the construction (schematic cross sectional view) of the liquid crystal display according to the present invention.

The present invention will be described in more detail hereinafter.

The color filter according to the present invention comprises a repetition of a plurality of different color pixels with a pitch of dozens to several hundreds micrometers. The color filter comprises at least two color pixels, usually three pixels of red (R), green (G) and blue (B) pixels.

The reflection area of the pixel in the color filter according to the present invention comprises a color area and transparent area. The transparent area as used herein actually refers to an area having a mean transmittance of 80% or more in the visible region. The effect of the present invention may be manifested by forming the transparent area with at least one color, since the difference between the transmission display and reflection display is reduced without increasing the number of manufacturing steps. In other colors, the transmission area and the reflection area may comprise the same color material with each other, and the thickness of the color material in the transmission area may be different from that in the reflection area by forming a transparent resin layer in the transmission area. The reflection area becomes to have a convex portion corresponding to the thickness of the transparent resin layer that is formed on the reflection area on the substrate, and the transmission area becomes lower relative to the reflection area with partially convex portions. The thickness of the color layer in the transmission area becomes larger than the thickness of the reflection area where convex portions are formed by planarization (leveling) with a non-photosensitive color paste or photosensitive color resist, when the color layer is formed by coating the substrate partial having convex portions with the non-photosensitive color paste and/or photosensitive color resist. The color of the reflection area may be controlled by means of leveling technology. The color for forming the transparent resin layer is not particularly restricted, and it may be either a red, green or blue pixel. However, when color characteristics are to be improved in the reflection area, it is preferable to form the transparent resin layer in the green pixel in order to improve brightness of the reflection display. Likewise, it is preferable to form the transparent resin layer in the blue pixel in order to improve white balance in the reflection area, when the color characteristics are to be improved in the reflection area.

The transparent resin layer as used in the present invention actually refers to a resin layer with a mean transmittance of 80% or more in the visible region. The thickness of the transparent resin layer formed in the reflection area is selected so as to reduce the differences of the color purity, brightness and color tone between the reflection display and transmission display considering the difference of the light source. The difference of thickness between the color layers formed in the reflection area and in the transmission area becomes larger by planarization as the thickness of the transparent resin layer is larger, thereby exerting a larger effect for reducing the differences of color purity, brightness and color tone between the transmission area and reflection area. However, since the step height on the surface of the color filter increases to adversely affect alignment of the liquid crystal and to deteriorate the image quality of the display when the transparent resin layer is too thick, the preferable thickness of the transparent resin layer is 5 μm or less.

The transparent resin layer according to the present invention can be formed using a photosensitive resist. The photosensitive resist available include a polyimide resin, an epoxy resin, an acrylic resin, a urethane resin, a polyester resin and a polyolefin resin, and the acrylic resin is preferable among them. While the photosensitive acrylic resin usually comprises at least an acrylic polymer, an acrylic polyfunctional monomer or oligomer, and a photopolymerization initiator in order to endow the resin with photosensitivity, the resin may be a so-called acrylic epoxy resin in which a epoxy monomer is added. It is possible to control roundness and planarity of the surface of the transparent resin layer by changing the distance between an exposure mask and a substrate on which the transparent resin layer is formed in the exposure step of the photolithographic processing, when the transparent resin layer is formed of the photosensitive resist.

The transparent resin layer according to the present invention may be formed using a non-photosensitive paste. Materials for the preferable non-photosensitive resin available include a polyimide resin, an epoxy resin, an acrylic resin, a urethane resin, a polyester resin and a polyolefin resin, and the polyimide resin is preferably used among them. The upper surface of the transparent resin layer is planarized by forming the transparent resin layer with the non-photosensitive paste, thereby enabling the transparent resin layer to have a smaller surface area.

Particles for light scattering may be incorporated into the transparent resin layer that is formed in the reflection area. Glitter of the display originating from direct reflection may be suppressed by allowing light-scattering particles to contain in the transparent resin layer, thereby enabling good display characteristics to be obtained. Furthermore, the light is not scattered in the transmission area since the transparent resin layer is not formed therein to enable the backlight to be efficiently used. The particles available for light-scattering include inorganic oxide particles such as silica, alumina and titania particles, metal particles and resin particles such as fluorinated polymer particles, and the silica particles are preferably used. The particle diameter of the light-scattering particles available is in the range of 0.1 to 10 µm. A particle diameter of the light-scattering particles smaller than the thickness of the transparent resin layer is more preferable for planarizing the transparent resin layer.

The color filter according to the present invention may comprise pixels comprising individual color layers for the transmission area and the reflection area. The same color layer as used herein refers to a color layer comprising the same composition and the weight ratio between the pigment and resin. The different color layer as used herein refers to a color layer in which either the pigment composition or the weight ratio between the pigment and resin is different. The pixel comprising different color layers between the transmission layer and reflection layer is not particularly restricted, and any of the red, green and blue pixels may be used. It is more preferable for improving brightness of the reflection display to make the color layer of the green pixel to be different between the transmission layer and reflection layer in order to improve color characteristics in the reflection area. It is also more preferable for improving white balance in the reflection display to make the color layer of the blue pixel to be different between the transmission layer and reflection layer in order to improve color characteristics in the reflection area.

Figure 2:
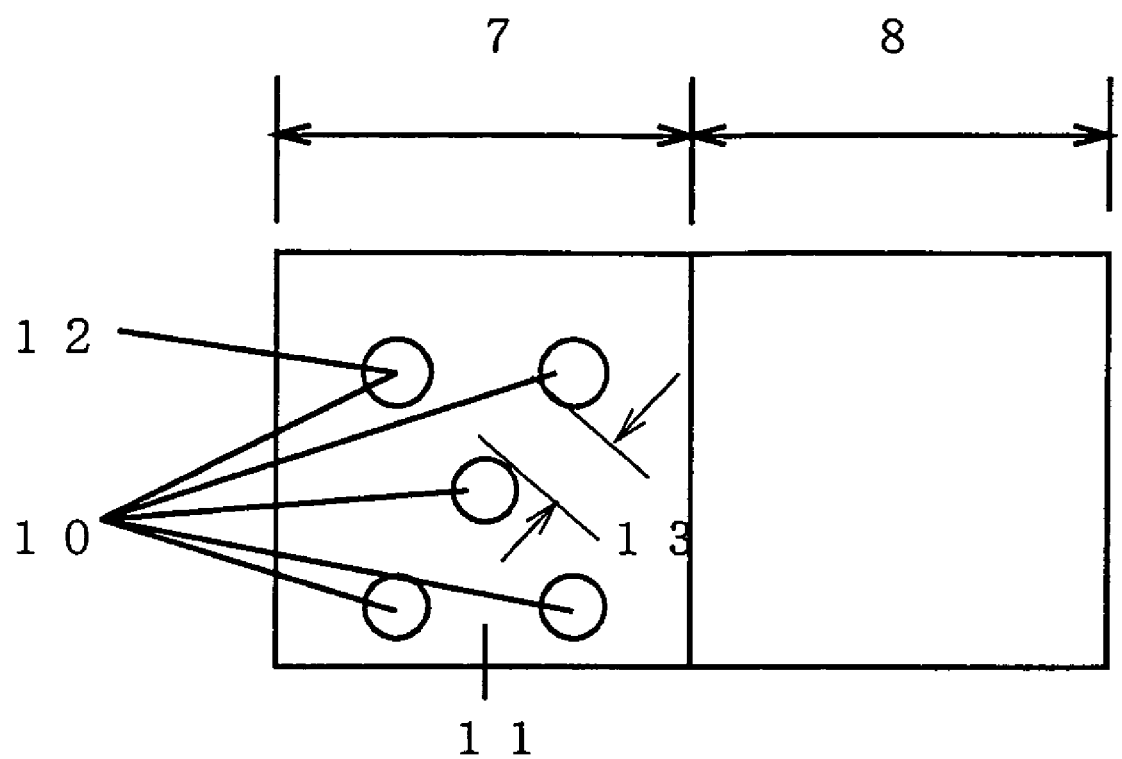
FIG. 2 shows another example of the construction (schematic plane view) of the liquid crystal display according to the present invention.
Figure 3:
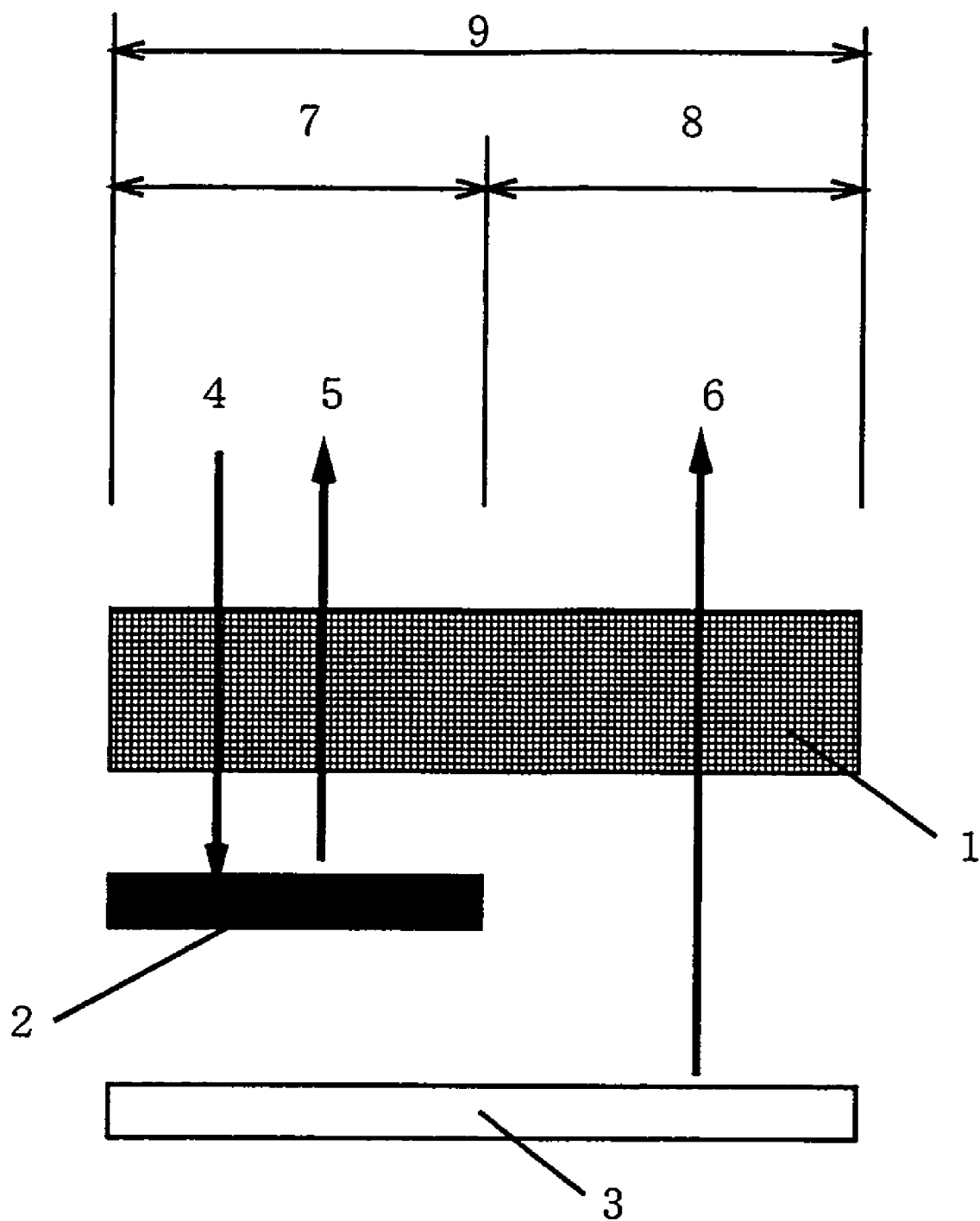
FIG. 3 shows an example of the construction (schematic cross sectional view) of the conventional liquid crystal display.

FIG. 2 shows a plane view of the liquid crystal display according to the present invention. As shown in the drawing, it is possible to divide the transparent area 10 into a plurality of areas. Each transparent area divided is called as a sub-area 12. The total area of the sub-areas in one pixel is defined as a size of the transparent area. Although the area may be arbitrarily divided as fine as possible, the sub-area cannot be properly formed when the division is too fine due to a limit of precision of processing, reducing the yield of the color filter to make it expensive. Too large division is also not preferable, on the other hand, since the step height between the color area and transparent area becomes too large. The step height as used-herein refers to a difference between the total thickness of the transparent area and the total thickness of the color layer area. The total thickness refers to a thickness from the substrate to the uppermost surface of the color filter, and the thickness of an overcoat layer or transparent conductive layer, if any, may be included in the total thickness. The size of the sub-area is required to be within the range of 20 to 2000 $\mu m^2$, more preferably in the range of 70 to 1500 $\mu m^2$, for the reasons described above.

Figure 4:
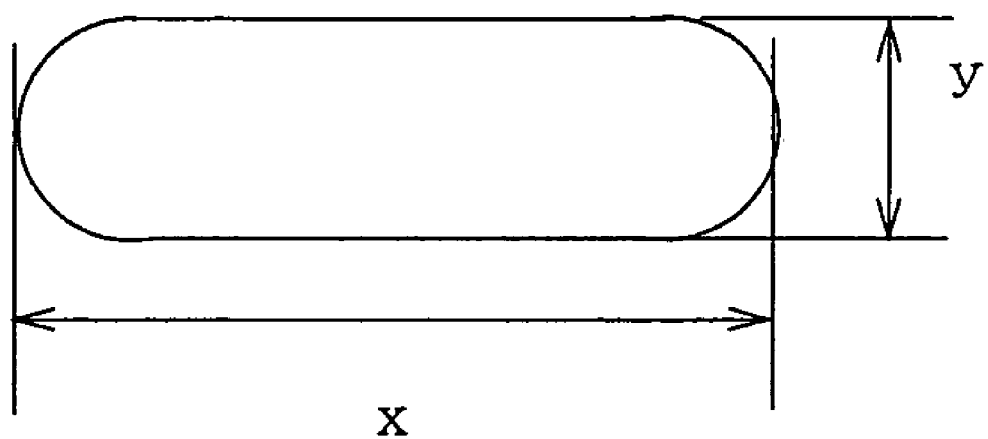
FIG. 4 illustrates an example of an area calculation method of the rectangular transparent area according to the present invention.
Figure 5:
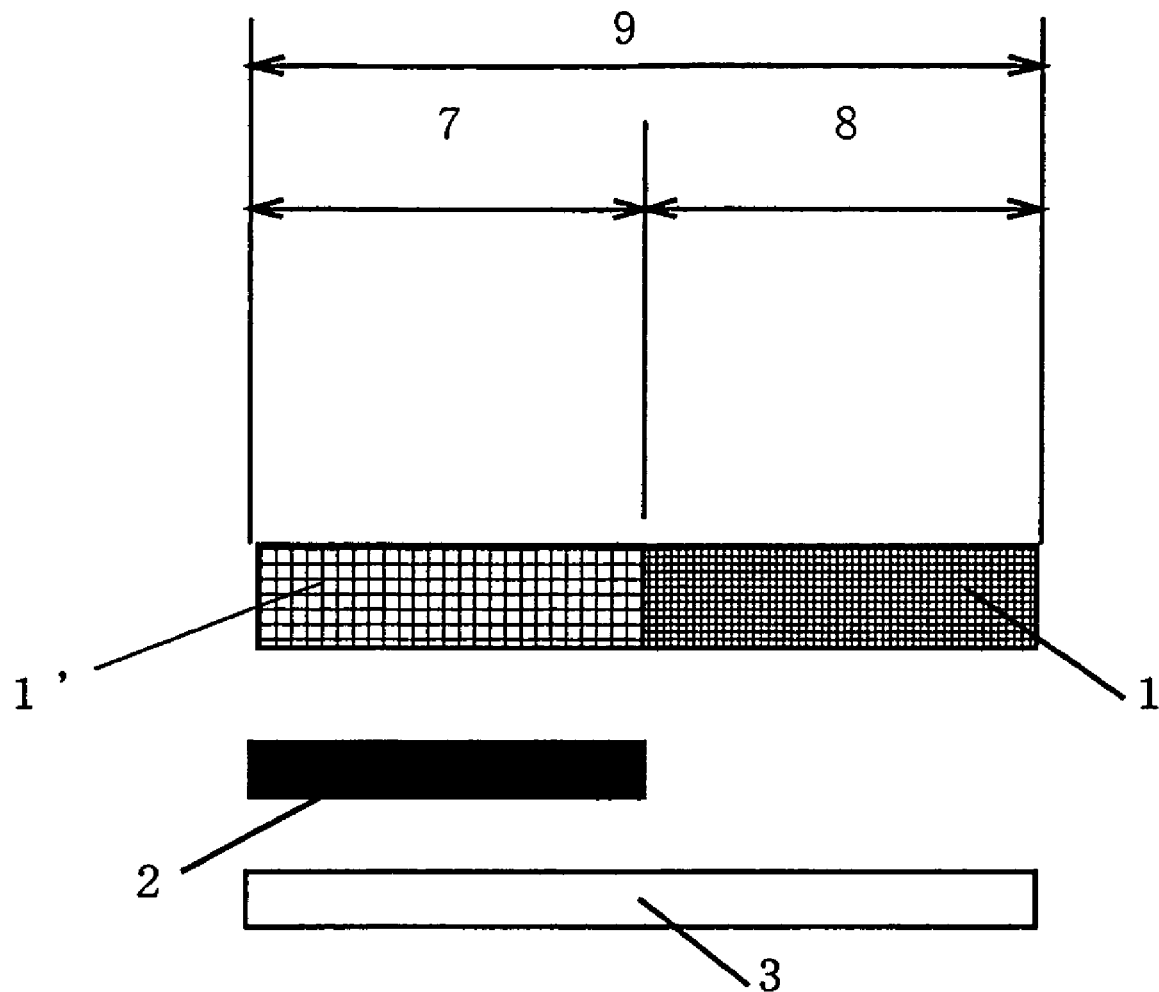
FIG. 5 shows another example of the construction (schematic cross sectional view) of the conventional liquid crystal display.
Figure 6:
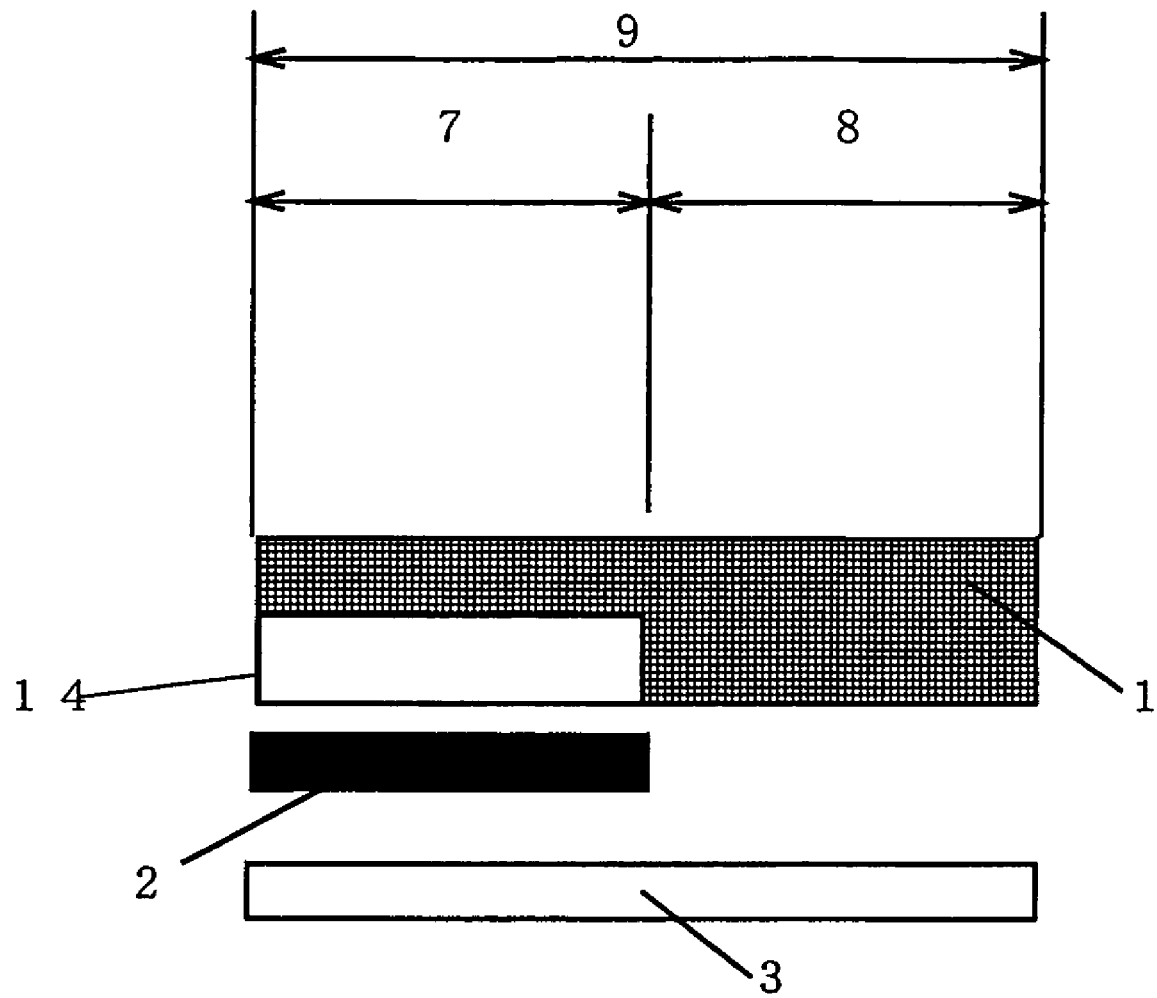
FIG. 6 shows a different example of the construction (schematic cross sectional view) of the conventional liquid crystal display.

The transparent area may be an arbitrary shape, and any shape is basically accepted. Since too fine portions in the shape may not be successfully formed, a shape that does not contain fine portions such as a circle, square or rectangle is preferable. Since a square with a side length of less than 5 µm, or a rectangle with a shorter side length of less than 5 µm is troublesome for processing, a length of larger than 5 µm is preferable. It is of no problem that the rectangle does not have strict right angle corners but actually is a shape of round corner track. Since the transparent area is required to have a size equal to the designed size, the transparent area may have the same size as the size of an intended rectangle. For example, the size is calculated as follows when the transparent area has a track shape as shown in FIG. 4:

$$S = y \times (x-y) + \pi \times (y/2)^2$$

The sub-area of the transparent area may be arbitrarily disposed in the reflection area. Although the disposition is arbitrary, it is preferable for uniformly display an image to evenly arrange the sub-areas in the transparent area without converging them. It is also preferable that the distance 13 from one sub-area to an adjoining sub-area (named as a distance between sub-areas hereinafter) is apart by 10 µm or more, in order to avoid sub-areas from interfering with each other considering precision of processing. The distance is more preferably 20 µm or more apart. The total thickness of the color layer portion between the two sub-areas becomes smaller than the thickness of the usual color layer portion when the distance is less than 20 µm, thereby forming a step height.

It is preferable to form an overcoat layer as a planarization layer on the color layer, in order to reduce the step height between the color area and transparent area. Examples of the material for the overcoat layer include an epoxy resin, an acrylic epoxy resin, a siloxane polymer based resin, polyimide resin, silicon containing polyimide resin and polyimide siloxane resin. The step height of the transparent area is filled with the overcoat layer to a certain extent to reduce the step height on the color filter. The thicker the overcoat layer is better for deducing the step height. However, there arise problems when the overcoat layer is too thick, because irregular cell gaps tend to be formed in manufacturing a panel since the layer is too soft, or because air bubbles are liable to be formed. Therefor, the preferable thickness is practically in the range of about 1.0 to 4.0 µm.

The step height between the color area and transparent area is preferably 0.5 µm or less. The step height is more preferably 0.4 µm or less since planarity of about 0.4 µm is required in a twisted nematic (TN) mode liquid crystal addressed by a thin film transistor (TFT). The thickness of the color layer is preferably in the range of 0.6 to 1.5 μm, since a color layer with a too large thickness makes it difficult to fill the step height between the color area and transparent area even by using the overcoat layer. A large step height between the color area and transparent area in the reflection area arises defective alignment (disclination) of the liquid crystal where brightness of white portions in the reflection display becomes extremely low. Otherwise, a light leaks at a dark background in the reflection display to cause a decreased contrast of the liquid crystal display.

The reflection area preferably contains the transparent area in the red pixel. However, no restrictions are imposed on the green and blue pixels, and either or neither of them may contain the transparent. The proportion of the size of the transparent area relative to the total size of the reflection area (named as a transparent area ratio hereinafter) is preferably determined so that the difference of chromaticity between the reflection display and transmission display becomes small considering the difference in the characteristics of the backlight source and natural light source. The chromaticity x of the transmission area of the red pixel in a chromaticity diagram of a CIE 1931 standard color coordinate system under a standard light source C is preferably in the range of $0.4 < x < 0.6$, particularly in the range of $0.45 < x < 0.58$, and more preferably in the range of $0.50 < x < 0.58$.

With respect to the chromaticity difference δ between the color coordinate $(x_0, y_0)$ in the CIE 1931 standard color coordinate system of the transmission area and the color coordinate $(x, y)$ in the CIE 1931 standard color coordinate system of the reflection area under the standard light source C, it is preferable that at least the two chromaticity coordinates satisfy the following equation:

$$\delta = (x-x_0)^2 + (y-y_0)^2 \leq 3 \times 10^{-3}$$

More preferably, the coordinates satisfy the following equation:

$$\delta = (x-x_0)^2 + (y-y_0)^2 \leq 1 \times 10^{-3}$$

The chromaticity of the transmission area as used herein is determined from spectra obtained by measuring the transmission area of the color filter with a microscopic spectrophotometer. The chromaticity of the reflection area is determined by calculating squares of spectral intensities of the color area and transparent area in the reflection area at each wave length, followed by calculating weighted averages with respect to the sizes of the color area and transparent area.

It is preferable to calculate the chromaticity using either one of the standard light source C, dual-wavelength light source or triple-wavelength light source for the transmission area, and a standard light source D65 for the reflection area. An example of the dual-wavelength LED light source as used herein is a LED light source that emits a white light by a combination of a blue LED and an yellow or yellowish green fluorescent substance. Examples of the triple wavelength light source include a triple wavelength fluorescent lamp, a white LED light source as a combination of a ultraviolet LED and red, blue and green fluorescent substances, a white LED light source as a combination of red, blue and green LEDs, and an organic electroluminescence light source.

A transparent area ratio is important in the pixel containing the transparent area in the color filter according to the present invention. The transparent area ratio preferably increases in the order of green>red=blue when a plurality of pixels containing the transparent area are used. It is particularly preferable that the transparent area ratios are 15% or more and 35% or less for the green pixel, 5% or more and 20% or less for the red pixel, and 20% or less for the blue pixel. More preferably, transparent area ratios are 20% or more and 30% or less for the green pixel, 8% or more and 16% or less for the red pixel, and 5% or more and 16% or less for the blue pixel. The transparent area ratio preferably increases in the order of red>blue when the dual wavelength LED light source is used, while the transparent area ratio preferably increases in the order of blue>red when the triple wavelength LED light source is used. A bright display cannot be obtained in the reflection display when the transparent area ratio shifts to a narrowed range from the range described above, while a clear display cannot be obtained in the reflection display when the transparent area ratio shifts to a wider range from the range described above.

Any material may be used for the substrate according to the present invention so long as the material is transparent and rigid. For example, a alkali-free glass, soda glass and plastic substrate may be used. The color layer may be formed on the active element side substrate.

Any materials may be used for the color layer according to the present invention, so long as the material transmits a light having an arbitrary color. While examples of the material for the color layer include a polymer film in which a pigment or dye is dispersed, PVA (polyvinyl alcohol) treated with a dye, and a $SiO_2$ film having a controlled thickness so as to transmit an arbitrary light, the polymer film in which a pigment is dispersed is preferable, and the polymer film is more preferably a polyimide film or an acrylic film in which a pigment is dispersed. These resins can form the color layer by a little or more simple process as compared with forming the color layer with other materials while being more excellent in heat resistance, light resistance and chemical resistance. The polyimide resin film is most advantageous for forming the transparent area among them since it is suitable for forming a pattern. When the polymer in which a pigment or dye is dispersed is used for the color layer, a paste of the color layer material is evenly coated on the substrate, followed by patterning by a photolithographic process including exposure and development.

The pixel is composed of a color layer formed into a prescribed pattern. While examples of the pattern include a stripe or an island shape, they are not restricted thereto. While the color layer is formed by photolithography, printing or electrodeposition, the method is not restricted thereto. The photolithographic method is preferable in view of pattern forming ability. Since the color layer is patterned by the photolithographic processing when a currently prevailing polymer film in which a pigment is dispersed is used as the color layer, the transparent area is also formed using a photomask.

While the pigments to be used in the present invention is not particularly restricted, those being excellent in light resistance, heat resistance and chemical resistance are desirable among the pigments. Examples of the representative pigments are described below using their color index (CI) numbers.

Examples of yellow pigments include pigment yellow Nos. 13, 17, 20, 24, 83, 86, 93, 94, 109, 110, 117, 125, 137, 138, 139, 147, 148, 150, 153, 154, 166, 173 and 180. Examples of orange pigments include pigment orange Nos. 13, 31, 36, 38, 40, 42, 43, 51, 55, 59, 61, 64, 65 and 71. Examples of the red pigments include pigment red Nos. 9, 97, 122, 123, 144, 149, 166, 168, 177, 180, 192, 206, 207, 209, 215, 216, 224, 242 and 254. Examples of the purple pigments include pigment violet Nos. 19, 23, 29, 32, 33, 36, 37 and 38. Examples of the blue pigments include pigment blue Nos. 15 (such as 15:3, 15:4 and 15:6), 21, 22, 60 and 64. Examples of the green pigments include pigment green Nos. 7, 10, 36 and 47.

A pigment subjected to a surface treatment such as a rosin treatment, an acidified treatment or a basified treatment may be used, if necessary. Abbreviations such as PR (pigment red), PY (pigment yellow), PV (pigment violet) and PO (pigment orange) are symbols of the color indices (C.I.; published by The Society of Dyes and Color List Co.), and they are formally described by attaching "C.I." at the top of the symbol (for example C.I. PR254). These symbols prescribe the standards of the dyes and dyeing, and each symbol identifies a dye and its color as a specified standard. Descriptions of C.I. are in principle omitted in the descriptions of the present invention (for example C.I. PR254 is described as PR254).

The red pixel of the color filter according to the present invention preferably contains the pigment PR254, in order to adjust the chromaticity in the range of 0.4<x<0.6 within a thickness of 0.6 to 1.5 μm. It is more preferable that the pixel contains a pigment comprising a quinacridone derivative. The pigment PR254 is a compound represented by the following structural formula (1):

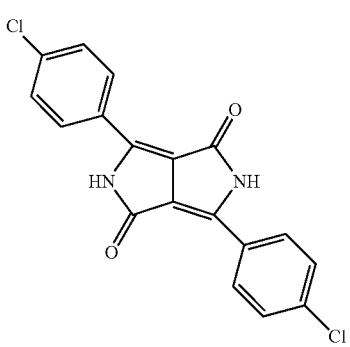

(1)

The quinacridone derivative according to the present invention is a compound represented by the following structural formula (2):

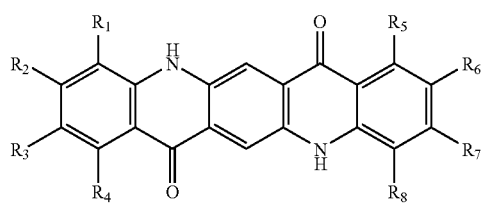

(2)

(In the structural formula (2), $R_1$ to $R_8$ independently denote a hydrogen atom, an allyl group such as an alkyl group, or a halogen atom such as a chlorine atom)

PR209 (in the structural formula (2), $R_3$ and $R_6$ denote chlorine atoms, and $R_1$, $R_2$, $R_4$, $R_5$, $R_7$ and $R_8$ denote hydrogen atoms, see the structural formula (3)) is particularly preferable among the pigments having the quinacridone derivatives, because the color paste containing PR209 can display a more reddish hue while maintaining brightness as compared with the color paste only comprising PR254.

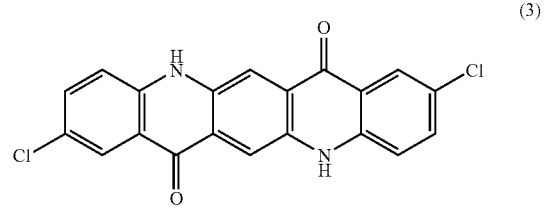

(3)

The content of PR254 in the red pixel is preferably 30 to 100% by weight of the total pigments, more preferably 40 to 90% by weight, in the present invention. The content of the pigment PR209 having the quinacridone derivative is preferably 1 to 60% by weight of the total pigments. When the amount of the pigment is out of the range above, a clear color display cannot be obtained by failing in obtaining the objective chromaticity, or the step height between the color area and transparent area becomes large due to increase of thickness of the pixel.

The color filter according to the present invention is used in combination with a semi-transmission type liquid crystal display. The semi-transmission type liquid crystal display as used herein refers to a liquid crystal display comprising a reflection layer as well as a backlight source, and is capable of both displays of a reflection display and transmission display. Any material may be used for the reflection layer so long as it can reflect a part of the incident light, and an aluminum foil or a foil of a silver-palladium-copper alloy is usually used. The color filter according to the present invention is not restricted by an addressing method and display method of the liquid crystal display, and can be applied for various kinds of liquid crystal displays operated by an active matrix method, passive matrix method, TN mode, STN mode, ECB mode or OCB mode. The color filter according to the present invention can be also used without being restricted by the construction of the liquid crystal display such as the number of polarizers and the location of scattering members.

An example of the method for manufacturing the color filter according to the present invention will be described hereinafter.

A color pixel containing a transparent area is formed at first. After coating a color paste comprising at least a polyamic acid, coloring agent and solvent on a transparent substrate, a color layer of the polyamic acid is formed after drying in air, by heating or in vacuum. An oven or a hot plate is used for heat-drying preferably by heating at 50 to 180° C. for 1 minute to 3 hours. Then, a pattern is formed on the color layer of polyamic acid obtained as described above by a conventional wet etching. A positive type photoresist is coated on the color layer of polyamic acid to form a photoresist layer. Subsequently, a mask comprising a pattern for forming a transparent area is placed on the photoresist layer followed by irradiating with a UV light using an exposure apparatus. The photoresist layer and color layer of polyamic acid are simultaneously etched after exposure with an alkaline developer for the positive type resist. The photoresist layer remained after etching is peeled off.

The color layer of polyamic acid is converted into a polyimide color layer thereafter by a heat treatment. The heat treatment is applied continuously or stepwise in air, in a nitrogen atmosphere or in vacuum at 150 to 350° C., preferably at 180 to 250° C., for 0.5 to 5 hours.

A transparent resin layer is formed in the reflection area, if necessary, and a color layer is formed on a pixel so that the thickness of the color layer is different in the reflection area and transmission area. The transparent resin layer is deposited in the reflection area before forming the color pixel comprising the transparent area. A non-photosensitive paste comprising polyamic acid and a solvent is coated on the entire surface of the transparent substrate on which the transparent resin layer is formed, and the substrate is dried on a hot plate at 60 to 200° C. for 1 to 60 minutes. Subsequently, a positive type photoresist is coated on the polyamic acid layer obtained as described above, and the photoresist layer is dried on a hot plate at 60 to 150° C. for 1 to 30 minutes. A desired pattern is printed on the photoresist layer by irradiating a UV light using an exposure apparatus, and a transparent resin layer having a desired pattern at a desired position is obtained by alkali development. The transparent resin layer is cured by heating at 200 to 300° C.

Otherwise, a photosensitive acrylic resin comprising at least an acrylic polymer, acrylic polyfunctional monomer and photo-polymerization initiator is coated on the transparent substrate on which the transparent resin layer is formed, and the substrate is dried in air, by heating or in vacuum to form a photosensitive acrylic color layer. An oven or a hot plate is used for drying by heating preferably at 60 to 200° C. for 1 minutes to 3 hours. Then, a UV light is irradiated to the photosensitive acrylic color layer to form a pattern using a photo-mask and exposure element. The photosensitive acrylic color layer is etched after exposure using an alkaline developer.

A different color layer for transmission area from that for reflection area is formed, if necessary, on one color pixel. A color paste comprising at least polyamic acid, a coloring agent and solvent, or a photosensitive color resist comprising an acrylic polymer, acrylic polyfunctional monomer, photo-polymerization initiator, coloring agent and solvent is coated on the substrate, followed by drying in air, by heating or in vacuum to form a color layer. An oven or a hot plate is used for drying at 50 to 200° C. for 1 minute to 3 hours.

A photoresist layer is formed by coating the positive photoresist when the color layer comprises polyamic acid. Then, a mask containing a pattern for forming the transmission area is placed on the photoresist layer, which is irradiated with a UV light using an exposure element. The photoresist layer and color layer of polyamic acid are simultaneously etched with an alkaline developer for the positive photoresist after exposure. The photoresist layer remaining after the etching is peeled off. The color layer of polyamic acid is converted into a polyimide color layer thereafter by heating.

When the color layer comprises a photosensitive acrylic resin, a pattern is formed on the photosensitive acrylic color layer using a photo-mask and an exposure element. The photosensitive acrylic color layer is etched after the exposure using an alkaline developer. The photosensitive acrylic color layer is cured thereafter by heating. The heat treatment is applied continuously or stepwise in air, in a nitrogen atmosphere or in vacuum at 150 to 350° C., preferably at 180 to 250° C., for 0.5 to 5 hours. Finally, the color layer is formed on the reflection area by the same method as used for forming the transmission layer.

The color filter for the liquid crystal display is manufactured by applying the foregoing steps with respect to the red, green and blue color paste, and with respect to the black color paste, if necessary.

Black matrices may be formed between the pixels in order to form a light-shielding area for improving the contrast of the liquid crystal display. While a metal foil (with a thickness of about 0.1 to 0.2 µm) of Cr, Al or Ni, or a resin film prepared by dispersing a light-shielding material in the resin is used for the black matrix, the resin black matrix free from reflection is usually used in the present invention since it may be used for the light shielding layer for the reflection area. Polyimide and acrylic resins are preferable for the light-shielding resin for their heat resistance and chemical resistance. While examples of the black pigment as the light-shielding material include pigment black 7 (carbon black) and titanium black, the material is not restricted thereto, and various pigments may be used. A pigment subjected to a rosin treatment, acidified treatment or basified treatment may be used, if necessary.

A transparent conductive film is usually formed on the uppermost surface of the color filter. The transparent conductive film is formed by, for example, a dipping method, chemical vapor growth method, vacuum vapor deposition method, sputtering method or ion plating method. Examples of the representative transparent conductive film include indium tin oxide (ITO), zinc oxide and tin oxide, and an alloy thereof. The thickness of the transparent conductive film is selected so as not to compromise the color display, and is preferably 0.5 µm or less.

Projections may be disposed on the color filter, if necessary. The projections are formed by lamination or by post-attachment. While the shape of the projection is not particularly restricted, the preferably used shape comprises a circle, square or rectangle in a plane view. The vertical cross section of the projection is usually a trapezoid having a smaller length of the upper side than the length of the lower side. The projections may be disposed with a given pitch such as one projection per several pixels, or may be randomly disposed.

An example of the liquid crystal display manufactured using the color filter above will be described below. A transparent overcoat layer is formed on the color filter, followed by forming a transparent electrode made of, for example, ITO film is formed thereon. Then, the color filter substrate is bonded with a reflection electrode substrate on which a reflection electrode such as a metal deposition film is formed in an opposed relation with each other via a liquid crystal alignment layer subjected to a rubbing treatment for aligning the liquid crystal provided on the substrate, and a spacer for maintaining a cell gap. A TFT liquid crystal display and TFD liquid crystal display may be manufactured by providing projections for light scattering, tin film transistors (TFT) and thin film diodes (TFD), scanning lines and signal lines on the reflection electrode substrate in addition to the reflection electrode. Subsequently, a liquid crystal is injected through an injection port provided at a seal part, and the liquid crystal display is sealed after the injection. Finally, IC drivers and the like are mounted to complete a module.

DESCRIPTION OF THE PREFERRED EMBODIMENTS

While the present invention is described in more detail with reference to preferred embodiments, the advantages of the present invention is by no means restricted to the embodiments cited.

Example 1

Design of the Color Filter

Transparent areas were formed in reflection areas (15,100 µm$^2$) for red, green and blue pixels with transparent area ratio of 8% (1,208 µm$^2$), 15% (2,290 µm$^2$) and 6% (906 µm$^2$), respectively. Sub-areas of the transparent area were formed by a combination of red circles with diameters of 20 µm (314 µm$^2$) and 13 µm (133 µm$^2$) green circles with a diameter of 38 µm (1,134 µm$^2$), and blue circles with diameters of 20 µm (314 μm²) and 5 μm (20 μm²). The sub-areas were randomly formed in the reflection area with a distance between the sub-areas of 10 μm.

(Preparation of Black Paste for Resin Black Matrix)

Allowed to react were 3,3',4,4'-biphenyl tetracarboxylic acid dianhydride, 4,4'-diaminodiphenyl ether and bis(3-aminopropyl)-tetramethyldisiloxane in N-methyl-2-pyrrolidone as a solvent to obtain a polyamic acid solution. A carbon black mill paste prepared by mixing carbon black and polyamic acid solution was dispersed using a homogenizer at 7000 rpm for 30 minutes. The homogenate was filtered through glass beads to obtain the black mill paste, which was diluted with the polyamic acid solution to form the black paste.

(Preparation of Color Paste for Forming Color Layer)

A. Preparation of polyamic Acid Solution

Mixed with 525 g of γ-butylolactone and 220 g of N-methyl-2-pyrrolidone were 95.1 g of 4,4'-diaminodophenyl ether and 6.2 g of bis(3-aminopropyl)tetramethyldisiloxane, followed by adding 144.1 g of 3,3',4,4'-biphenyltetracarboxylic acid dianhydride. After allowing the mixture to react for 3 hours at 70° C., 3.0 g of phthalic anhydride was added. The mixture was further allowed to react for 2 hours at 70° C. to obtain a polyamic acid (PAA) solution with a concentration of 25% by weight.

B. Synthesis of Polymer Dispersing Agent

Mixed were 161.3 g of 4,4'-diaminobenzanilide, 176.7 g of 3,3'-diaminodiphenyl sulfone and 18.6 g of bis(3-aminopropyl)tetramethyldisiloxane with 2,667 g of γ-bytylolactone and 527 g of N-methyl-2-pyrrolidone, and 439.1 g of 3,3',4,4'-biphenyltetracarboxylic acid dianhydride was added to the mixture. After allowing the mixture to react at 70° C. for 3 hours, 2.2 g of phthalic anhydride was added followed by allowing to react at 70° C. for additional 2 hours, thereby obtaining a polymer dispersing agent (PD) as a polyamic acid solution with a concentration of 20% by weight.

C. Preparation of Non-Photosensitive Color Paste

Added were 90 g of glass beads in a mixture comprising 4.5 g of pigment red PR254, 22.5 g of polymer dispersing agent (PD), 42.8 g of γ-butylolactone and 20.2 g of 3-methoxy-3-methyl-1-butanol. After dispersing the mixture with a homogenizer at 7,000 rpm for 5 hours, the glass beads were filtered off, thereby obtaining a 5% dispersion solution (RD) comprising PR254.

A solution prepared by diluting 24 g of the polyamic acid solution (PAA) with 120.0 g of γ-butylolactone was added to and mixed with 51 g of the dispersion solution (RD) to obtain a red color paste (RPI-1). The red pastes (RPI-2, RPI-3, RPI-4 and RPI-5), green pastes (GRI-1 and GPI-2)), and blue pastes (BPI-1 and BPI-2) with pigment compositions as shown in Table 1 were obtained by the same method as described above.

D. Preparation of Photosensitive Color Resist

Mixed was 35.2 g of pigment blue PB15:6 with 50 g of 3-methyl-3-methoxybutanol. After dispersing the mixture with a homogenizer at 7,000 rpm for 5 hours, glass beads were filtered off to obtain a dispersion solution. A photosensitive acrylic resin solution (AC-1) with a concentration of 20% by weight was prepared by adding 35.00 g of an acrylic copolymer solution (a 43% by weight solution of Saikuroma P, ACA-250, made by DAICEL Chemical Industries, LTD), 15.00 g of pentaerythritol tetramethacrylate as a polyfunctional monomer, and 7.50 g of IRGACURE 369 as a photopolymerization initiator (made by Ciba Specialty Chemicals Co.) in 130 g of cyclopentanone. A blue resist (BAC-1) was obtained by adding 10 g of the blue dispersion solution in 22.4 g of the photosensitive acrylic resin solution.

TABLE 1

| PASTE No. | COMPOSITION OF PIGMENT (WEIGHT RATIO) | PIGMENT/RESIN (WEIGHT RATIO) |
|---|---|---|
| PRI-1 | PR254 = 100 | 23/77 |
| PRI-2 | PR254/PR209 = 60/40 | 30/70 |
| PRI-3 | PR209 = 100 | 90/10 |
| PRI-4 | PR209 = 100 | 40/60 |
| PRI-5 | PR209/PO38 = 85/15 | 40/60 |
| GPI-1 | PG36/PY138 = 70/30 | 40/60 |
| GPI-2 | PG36/PY138 = 55/45 | 15/85 |
| BPI-1 | PR15:6 = 100 | 25/75 |
| BPI-2 | PB15:6/PV23 = 96/4 | 12/88 |
| BAC-1 | PB15:6 = 100 | 25/75 |

(Preparation of Non-Photosensitive Paste used for Transparent Resin Layer)

A non-photosensitive transparent paste was obtained by diluting 16.0 g of polyamic acid solution (PAA) with 34.0 g of γ-butylolactone.

(Preparation of Color Filter)

The black paste was coated on a substrate manufactured by patterning an aluminum reflection layer on a non-alkaline glass substrate (No. 1737 made by Corning Japan Co.) using a curtain-flow coater, and a black resin layer was formed by drying the substrate on a hot plate at 130° C. for 10 minutes. A positive photoresist (SRC-100 made by Shipley Co.) was coated on the resin layer with a reverse roll coater, dried on a hot plate at 100° C. for 5 minutes, and pre-baked for 5 minutes. The coating layer was exposed with a UV light with a luminous energy of 100 mJ/cm² through a photo-mask using a Proximity Exposure XG-5000 made by DAINIPPON SCREEN MFG. Co. LTD. The photoresist was developed simultaneously with etching the resin layer using 2.25% of an aqueous solution of tetramethylammonium hydroxide to form a pattern. The photoresist was peeled off with methylcellosolve acetate, and a black matrix was formed by converting the resin layer into an imide derivative by heating at 290° C. for 10 minutes on a hot plate. The black matrix had a thickness of 1.10 μm and an OD value of 3.0.

Then, the red paste (RPI-1) was coated on the resin black matrix with a curtain coater, and dried on a hot-plate at 130° C. for 10 minutes to form the red resin layer. The positive photoresist was coated thereafter with a reverse coater as in forming the black paste, followed by pre-baking at 100° C. for 5 minutes on a hot-plate. Then, a UV light with a luminous energy of 100 mJ/cm² was irradiated for exposure through a photo-mask on which the transparent area had been formed in the reflection area on the resin black mask matrix substrate on which the red paste and photoresist had been formed using the same exposure apparatus as used in the black paste. Subsequently, the photoresist was developed simultaneously with etching the resin layer to form a pattern using a 2.25% aqueous solution of tetramethylammonium hydroxide. The resist was peeled off with methylcellosolve acetate, and the resin layer was converted into an imide derivative by heating at 280° C. for 10 minutes on a hot plate to form the red pixel. The red resin layer had a thickness of 1.1 μm, and the chromaticity coordinate (x, y) of the transmission area obtained by measuring under the standard light source C was (0.511, 0.286).

The green paste (GPI-1) described above was coated on the substrate comprising the red pixel formed on the resin black matrix after washing the substrate with water, thereby forming the green pixel by patterning by the same method as used in forming the red pixel. The chromaticity coordinate (x, y) of the transmission region measured under the standard light source C was (0.304, 0.508). In the next step, the blue paste (BPI-1) was coated on the substrate comprising the red and green pixels formed on the resin black matrix layer after washing the substrate with water, followed by patterning to obtain the blue pixels. The chromaticity coordinate (x, y) of the transmission area measured under the standard light source C was (0.146, 0.178). Subsequently, a solution of a curable composition obtained by allowing a hydrolysis product of γ-aminopropylmethyl diethoxysilane to react with 3,3', 4,4'-benzophenone tetracarboxylic acid dianhydride was spin-coated on the substrate followed by heat-treating at 260° C. for 10 minutes, thereby forming an overcoat layer with a thickness of 1.5 μm in the area out of the pixels.

Finally, an ITO layer was sputtered at a thickness of 0.1 μm. The size of the sub-area, thickness of the color layer, the step height between the color area and transparent area in the reflection area, and the difference of chromaticity δ between the reflection area and transmission area of the color filter obtained as described above are shown in Table 2. The chromaticity of the reflection area measured under the standard light source D65, and the chromaticity of the transparent area measured under dual wavelength LED light source are shown in Table 3.

TABLE 2

| | | COLOR MATERIAL | TRANSPARENT AREA RATIO | SUB-AREA SIZE | THICKNESS OF COLOR LAYER | STEP HEIGHT IN REFLECTION AREA | No. OF PHOTO-PROCESSING STEPS | CHROMATICITY DIFFERENCE δ REFLECTION/TRANSMISSION |
|---|---|---|---|---|---|---|---|---|
| EXAMPLE 1 | R | RPI-1 | 8% | 314 μm²(20 μmφ), 79 μm²(10 μmφ) | 1.1 μm | 0.2 μm | 3 TIMES | 3.11E−06 |
| | G | GPI-1 | 15% | 1134 μm²(38 μmφ) | | | | 1.78E−03 |
| | B | BPI-1 | 6% | 314 μm²(20 μmφ), 20 μm²(5 μmφ) | | | | 1.53E−04 |
| EXAMPLE 2 | R | RPI-1 | 8% | 600 μm²(50 μm × 12 μm) | | | | 3.11E−06 |
| | G | GPI-1 | 15% | 1140 μm²(76 μm × 15 μm) | | | | 1.78E−03 |
| | B | BPI-1 | 6% | 300 μm²(60 μm × 5 μm) | | | | 1.53E−04 |
| EXAMPLE 3 | R | RPI-2 | 8% | 600 μm²(50 μm × 12 μm) | | | | 5.29E−06 |
| | G | GPI-1 | 15% | 1140 μm²(76 μm × 15 μm) | | | | 1.78E−03 |
| | B | BPI-1 | 6% | 300 μm²(60 μm × 5 μm) | | | | 1.53E−04 |
| EXAMPLE 4 | R | RPI-1 | 8% | 600 μm²(50 μm × 12 μm) | | | 4 TIMES | 3.11E−06 |
| | G | GPI-1, 2 | — | — | | | | 4.29E−05 |
| | B | BPI-1 | 6% | 300 μm²(60 μm × 5 μm) | | | | 1.53E−04 |
| EXAMPLE 5 | R | RPI-1 | 8% | 600 μm²(50 μm × 12 μm) | | | | 3.11E−06 |
| | G | GPI-1 | 15% | 1140 μm²(76 μm × 15 μm) | | | | 1.78E−03 |
| | B | BPI-1, 2 | — | — | | | | 4.34E−05 |
| EXAMPLE 6 | R | RPI-1 | 8% | 600 μm²(50 μm × 12 μm) | | | | 3.11E−06 |
| | G | GPI-1 | 15% | 1140 μm²(76 μm × 15 μm) | | | | 1.78E−03 |
| | B | BAC-1 | — | — | | | | 1.08E−04 |
| COMPARATIVE EXAMPLE 1 | R | RPI-1 | 8% | 314 μm²(20 μmφ), 79 μm²(10 μmφ) | 1.1 μm | 0.2 | 3 TIMES | 3.11E−06 |
| | G | GPI-1 | 15% | 1134 μm²(38 μmφ) | | 0.2 | | 1.78E−03 |
| | B | BPI-1 | DEFECTIVE PROCESSING | 707 μm²(30 μmφ), 12.6 μm²(4 μmφ) | | DEFECTIVE PROCESSING | | — |
| COMPARATIVE EXAMPLE 2 | R | RPI-1 | 15% | 2290 μm²(54 μmφ) | | 0.7 μm | | 2.51E−03 |
| | G | GPI-1 | | | | | | 1.78E−03 |
| | B | BPI-1 | | | | | | 2.56E−03 |
| COMPARATIVE EXAMPLE 3 | R | RPI-1 | 8% | 600 μm²(50 μm × 12 μm) | | 0.2 | | 3.11E−06 |
| | G | GPI-1 | 15% | 1140 μm²(76 μm × 15 μm) | | 0.2 | | 1.78E−03 |
| | B | BPI-1 | DEFECTIVE PROCESSING | 208 μm²(52 μm × 4 μm), 18 μm²(6 μm × 3 μm) | | DEFECTIVE PROCESSING | | — |
| COMPARATIVE EXAMPLE 4 | R | RPI-1 | DEFECTIVE PROCESSING | 314 μm²(20 μmφ), 79 μm²(10 μmφ) | | DEFECTIVE PROCESSING | | — |
| | G | GPI-1 | | 1134 μm²(38 μmφ) | | | | — |
| | B | BPI-1 | | 707 μm²(30 μmφ), 12.6 μm²(4 μmφ) | | | | — |
| COMPARATIVE EXAMPLE 5 | R | RPI-3 | DEFECTIVE PROCESSING | 314 μm²(20 μmφ), 79 μm²(10 μmφ) | | DEFECTIVE PROCESSING | | — |
| | G | GPI-1 | 15% | 1134 μm²(38 μmφ) | | 0.2 | | 1.78E−03 |
| | B | BPI-1 | DEFECTIVE PROCESSING | 707 μm²(30 μmφ), 12.6 μm²(4 μmφ) | | DEFECTIVE PROCESSING | | — |
| COMPARATIVE EXAMPLE 6 | R | PRI-4 | 8% | 314 μm²(20 μmφ), 79 μm²(10 μmφ) | 2.9 μm | 0.9 μm | | 2.19E−04 |
| | G | GPI-1 | 15% | 1134 μm²(38 μmφ) | 1.1 μm | 0.2 μm | | 1.78E−03 |
| | B | BPI-1 | DEFECTIVE PROCESSING | 707 μm²(30 μmφ), 12.6 μm²(4 μmφ) | 1.1 μm | DEFECTIVE PROCESSING | | — |
| COMPARATIVE EXAMPLE 7 | R | RPI-1 | — | — | 1.1 μm | 0.0 μm | | 6.56E−03 |
| | G | GPI-1 | — | — | | | | 1.11E−02 |
| | B | BPI-1 | — | — | | | | 1.22E−03 |
| COMPARATIVE EXAMPLE 8 | R | RPI-1, 5 | — | — | | | 6 TIMES | 3.70E−05 |
| | G | GPI-1, 2 | — | — | | | | 4.29E−05 |
| | B | BPI-1, 2 | — | — | | | | 4.34E−05 |

TABLE 3

(EXAMPLES 1 AND 2)

| | CHROMATICITY OF TRANSMISSION AREA (DUAL WAVELENGTH LED LIGHT SOURCE) | | | | | CHROMATICITY OF REFLECTION AREA (STANDARD LIGHT SOURCE D65) | | | |
|---|---|---|---|---|---|---|---|---|---|
| | x | y | z | COLOR REPRODUCIBLE RANGE | | x | y | z | COLOR REPRODUCIBLE RANGE |
| R | 0.536 | 0.329 | 31.7 | 31% | R | 0.534 | 0.328 | 27.6 | 32% |
| G | 0.332 | 0.502 | 66.7 | | G | 0.291 | 0.497 | 58.8 | |
| B | 0.147 | 0.172 | 23.0 | | B | 0.158 | 0.167 | 20.1 | |
| W | 0.318 | 0.334 | 40.5 | | W | 0.305 | 0.330 | 35.5 | |

The transmittance and chromaticity coordinate were measured using a glass, on which ITO is deposited by the same deposition condition as forming ITO on the color filter, as a reference with a Multi-Channel Photo Detector MCPD-2000 made by OTSUKA ELECTRONICS CO. LTD.

The chromaticity of the transmission area as used herein is obtained from spectra obtained by measuring the transmission area of the color filter with the Multi-Channel Photo Detector described above. The chromaticity of the reflection area is determined by squaring each spectral intensity in the reflection area and transparent area at corresponding wavelengths, and calculating weighted averages of the squares with respect to the sizes of the color area and transparent area.

The step height was evaluated with a stylus force of 10 mg/cm$^2$ and scanning speed of 10 μm/sec using a surface texture measuring instrument SURFCOM 1500A made by TOKYO SEIMITSU Co.

(Preparation of Projections)

Allowed to react in N-methyl-2-pyrrolidone as a solvent were 3,3',4,4'-biphneyltetracarboxylic dianhydride, 4,4-diaminophenyl ether and bis(3-aminopropyl)tetramethyl disiloxane to obtain a polyamic acid solution as a material for forming the projections. The polyamic acid solution was coated on the substrate, and was dried in hot air at 90° C. for 15 minutes followed by semi-curing at 125° C. for 20 minutes. A positive resist (SRC-100 made by Shipley Far-East Co.) was coated with a spinner thereafter, followed by drying at 80° C. for 20 minutes. The photoresist was exposed using a mask, and the substrate was dipped in an alkaline developer (Microposit 351 made by Shipley Far-East Co.) for simultaneous development of the positive resist and etching of the polyamic acid layer. The positive resist was peeled off thereafter with methylcellosolve acetate followed by curing the polyamic acid layer at 300° C. for 30 minutes. The thickness of the resin layer was 5.2 μm Projections were formed within and on the frame of screen of the liquid crystal display and on the base of the black matrix out of the screen.

The area of the upper face of the projections on the resin layer within the screen was about 110 μm$^2$, and the area of the lower face of the projections under the resin layer within the screen was 120 μm$^2$. The projections with an upper face size of 110 μm$^2$ and lower face size of 120 μm$^2$ were also formed on the frame. The upper face size and lower face size of the projections out of the screen were 10,000 μm$^2$ (100×100 μm) and 12,000 m$^2$ (110×110 μm), respectively, with an elevation of the projection of 6 μm. One projection was provided per three pixels within the screen.

(Manufacture of Liquid Crystal Display)

A polyimide alignment layer was formed on the color filter, and the layer was rubbed. The polyimide alignment layers subjected to rubbing treatment were also formed on the transparent electrode comprising thin film transistors and on the opposed substrate comprising a reflection layer. After bonding the color filter comprising the alignment layer to the transparent electrode substrate comprising the thin film transistor using a seal agent, the liquid crystal was injected into the gap through an injection port formed at the seal part. For injecting the liquid crystal, an empty liquid crystal cell was allowed to stand under a reduced pressure, and the injection port was dipped into a liquid crystal vessel followed by returning the pressure to an atmospheric pressure. The injection port was sealed after injection of the liquid crystal. Finally, a polarizer was bonded to the outside of the substrate to manufacture the liquid crystal cell.

Example 2

A color filter was manufactured by the same method as in Example 1, except that a red sub-area with a rectangle of 50 μm×12 μm (600 μm$^2$), a green sub-area with a rectangle of 76 μm×15 μm (1,140 μm$^2$), and a blue sub-area with a rectangle of 60 μm×5 μm (300 μm$^2$) were formed in the transparent area. While the pattern formed comprises rectangles having round corners, there are no problems so long as the rectangles have the same total size as the designed size since the total size is crucial for the transparent area. The total size was evaluated by the method as shown in FIG. 4.

Comparative Example 1

A color filter was manufactured by the same method as in Example 1, except that the sub-area of the blue pixel was formed by a combination of circles with a diameter of 30 μm (707 μm$^2$) and with a diameter of 4 μm (12.6 μm$^2$).

Comparative Example 2

A color filter was manufactured by the same method as in Example 1, except that the sub-areas of the red, green and blue pixels were formed as circles with a diameter of 54 μm (2,290 μm$^2$), respectively.

Comparative Example 3

A color filter was manufactured by the same method as in Example 2, except that the sub-area of the blue pixel was formed by a combination of rectangles with a dimension of 52 μm×4μ (208 μm$^2$) and with a dimension of 6 μm×3μ (18 μm$^2$).

Comparative Example 4

A color filter was manufactured by the same method as in Comparative Example 1, except that the distance between the sub-areas formed in each pixel was adjusted to 8 μm.

A comparison between Examples 1 and 2 and Comparative Examples 1 to 4 is shown in Table 2.

Color filters having small differences of brightness and chromaticity between the transmission area and reflection area were obtained in Examples 1 and 2. In addition, the number of manufacturing steps is not increased in these color filters as compared with conventional color filters. These results suggest that color filters being excellent in display characteristics and processing performance could be obtained.

The color filter in Comparative Example 1 was difficult to process due to too small sub-area in blue pixel.

In the color filter in Comparative example 2, the sub-area was so large that the step height on the surface of the reflection area was increased to 0.5 μm or more, arising problematic display characteristics.

The color filter in Comparative Example 3 was difficult to process due to too fine sub-area in blue pixel.

The transparent area could not be processed into a proper shape and size in Comparative Example 4 since the distance between adjoining sub-areas was 10 μm or less. Patterning of the sub-area was also difficult since the sub-area in blue pixel was too small.

Example 3

A color filter was manufactured by the same method as in Example 1, except that RPI-2 was used as the red paste. The red paste RPI-2 contains PR254 and PR209 comprising the quinacridone derivative in a proportion of PR254/PR209=60/40 in weight ratio. The thickness of the red resin layer obtained was 1.1 μm. The chromaticity coordinate (x, y) of the transmission area measured under the standard light source C was (0.511, 0.290). The size of the sub-area, the thickness of the pixel, the step height between the color area and transparent area in the reflection area, and the difference of chromaticity δ between the reflection area and transmission area are shown in Table 2. The chromaticity of the reflection area under the standard light source D65, and the chromaticity of the transmission area under the dual wavelength LED light source are shown in Table 4.

red paste. Only PR209 having the quinacridone derivative mainly used in the reflection type color filter was used in the red paste PRI-3 as the pigment component, and the weight ratio between the pigment and resin was 90/10 in the paste. The red pixel obtained had the same thickness of 1.1 μm as the thickness of the color layer in Example 1. The chromaticity coordinate (x, y) of the transmission area measured under the standard light source C was (0.511, 0.290), showing the same degree of color purity as obtained in Example 1. However, fine cracks appeared in the pixel as well as in the ITO layer during the photolithographic processing. The size of the sub-area in blue pixel was so small that patterning was difficult.

Comparative Example 6

A color filter was manufactured by the same method as in Comparative Example 1, except that RPI-4 was used as the red paste. Only PR209 having the quinacridone derivative mainly used in the reflection type color filter was used in the red paste PRI-4 as the pigment component, and the weight ratio between the pigment and resin in the paste was 40/60, which was possible to apply photolithographic processing. The color paste was coated so as to obtain the same degree of color purity as in Comparative example 1, obtaining a thickness of the color layer of 2.9 μm. The chromaticity coordinate (x, y) of the transmission area measured under the standard light source C was (0.511, 0.290). The step height in the reflection area after coating the overcoat layer was 0.9 μm. The size of the sub-area in blue pixel was so small that patterning was difficult.

A color filter having small differences of brightness and chromaticity between the transmission area and reflection area was obtained in Example 3 as in Examples 1 and 2. The color tone of the red light in the transmission display was reddish with more clear color. In addition, the number of manufacturing steps was not increased as compared with manufacturing of the conventional color filters, indicating that a color filter with quite excellent display characteristics and processing performance could be obtained.

The color filter in Comparative Example 5 could not be used for the liquid crystal display due to cracks in the red pixel.

A step height of 0.5 μm or more was found on the surface in the reflection area in Comparative Example 6, arising problematic display characteristics.

TABLE 4

(EXAMPLE 3)

| | CHROMATICITY OF TRANSMISSION AREA (DUAL WAVELENGTH LED LIGHT SOURCE) | | | | | CHROMATICITY OF REFLECTION AREA (STANDARD LIGHT SOURCE D65) | | | |
|---|---|---|---|---|---|---|---|---|---|
| | x | y | z | COLOR REPRODUCIBLE RANGE | | x | y | z | COLOR REPRODUCIBLE RANGE |
| R | 0.537 | 0.326 | 32.1 | 32% | R | 0.535 | 0.327 | 28.5 | 33% |
| G | 0.332 | 0.502 | 66.7 | | G | 0.291 | 0.497 | 58.8 | |
| B | 0.147 | 0.172 | 23.0 | | B | 0.158 | 0.167 | 20.1 | |
| W | 0.320 | 0.334 | 40.6 | | W | 0.307 | 0.330 | 35.8 | |

Comparative Example 5

A color filter was manufactured by the same method as in Comparative Example 1, except that RPI-3 was used as the Example 4

A color filter was manufactured by the same method as in Example 1, except that a color layer formed of the green paste GPI-1 was deposited in the transmission area, and a color layer formed of the green paste GPI-2 was deposited in the reflection area. Both the transmission area and reflection area of the green pixel obtained had the same thickness of 1.1 μm. The chromaticity coordinate (x, y) of the reflection area measured under the standard light source C was (0.328, 0.421). The size of the sub-area, the thickness of the color layer, the step height between the color area and transparent area in the reflection area, and the difference of chromaticity δ between the reflection area and transmission area are shown in Table 2. The chromaticity of the reflection area under the standard light source D65, and the chromaticity of the transmission area under the dual wavelength LED light source are shown in Table 5.

TABLE 5

(EXAMPLE 4)

| | CHROMATICITY OF TRANSMISSION AREA (DUAL WAVELENGTH LED LIGHT SOURCE) | | | | | CHROMATICITY OF REFLECTION AREA (STANDARD LIGHT SOURCE D65) | | | |
|---|---|---|---|---|---|---|---|---|---|
| | x | y | z | COLOR REPRODUCIBLE RANGE | | x | y | z | COLOR REPRODUCIBLE RANGE |
| R | 0.536 | 0.329 | 31.7 | 31% | R | 0.534 | 0.328 | 27.6 | 31% |
| G | 0.332 | 0.502 | 66.7 | | G | 0.326 | 0.502 | 75.0 | |
| B | 0.147 | 0.172 | 23.0 | | B | 0.158 | 0.167 | 20.1 | |
| W | 0.318 | 0.334 | 40.5 | | W | 0.319 | 0.347 | 40.9 | |

Example 5

A color filter was manufactured by the same method as in Example 1, except that a color layer formed of the blue paste BPI-1 was deposited in the transmission area, and a color layer formed of the blue paste BPI-2 was deposited in the reflection area. Both the transmission area and reflection area of the blue pixel obtained had the same thickness of 1.1 μm. The chromaticity coordinate (x, y) of the reflection area measured under the standard light source C was (0.185, 0.223). The size of the sub-area, the thickness of the color layer, the step height between the color area and transparent area in the reflection area, and the difference of chromaticity δ between the reflection area and transmission area are shown in Table 2. The chromaticity of the reflection area under the standard light source D65, and the chromaticity of the transmission area under the dual wavelength LED light source are shown in Table 6.

Example 6

The non-photosensitive paste (TPI-1) was coated on a glass substrate with a black matrix prepared as in Example 1 using a spinner.

The coated layer was dried in an oven at 120° C. for 20 minutes, a positive photoresist (OFPR-800 made by TOKYO OHKA KOGYO Co.) was coated on the layer, and the photoresist layer was dried in an oven at 90° C. for 10 minutes. The photoresist was exposed via a photo-mask pattern at a luminous energy of 60 mJ/cm$^2$ (UV light intensity at 365 nm) so as to remain transparent resin layers in the reflection areas of the red, green and blue pixels. After the exposure, the substrate was immersed in a developer comprising 1.6% aqueous solution of tetramethylammonium hydroxide to simultaneously develop the photoresist and etch the polyamic acid layer. The photoresist layer remaining after the etching was peeled off with acetone, and the substrate was heat-treated at 240° C. for 30 minutes to form a transparent resin layer in the reflection area of each pixel. The thickness of the transparent resin layer was 1.5 μm.

Subsequently, the red and green pixels were formed by the same method as in Example 1. The color layer of the red pixel had the same thickness of 1.1 μm in both the reflection area and transmission area. The color layer of the green pixel also had the same thickness of 1.1 μm in both the reflection area and transmission area. The blue resist (BAC-1) was coated on the glass substrate on which the transparent resin layer, red pixel and green pixel had been formed with a spinner, and the coated layer was heat-treated in an oven at 80° C. for 10 minutes. The transmission area and reflection area of the blue pixel were exposed at a luminous energy of 100 mJ/cm$^2$ (the

TABLE 6

(EXAMPLE 5)

| | CHROMATICITY OF TRANSMISSION AREA (DUAL WAVELENGTH LED LIGHT SOURCE) | | | | | CHROMATICITY OF REFLECTION AREA (STANDARD LIGHT SOURCE D65) | | | |
|---|---|---|---|---|---|---|---|---|---|
| | x | y | z | COLOR REPRODUCIBLE RANGE | | x | y | z | COLOR REPRODUCIBLE RANGE |
| R | 0.536 | 0.329 | 31.7 | 31% | R | 0.534 | 0.328 | 27.6 | 32% |
| G | 0.332 | 0.502 | 66.7 | | G | 0.291 | 0.497 | 58.8 | |
| B | 0.147 | 0.172 | 23.0 | | B | 0.146 | 0.179 | 23.3 | |
| W | 0.318 | 0.334 | 40.5 | | W | 0.296 | 0.330 | 36.6 | | intensity of the UV light at 365 nm) through a light transmissible chromium photo-mask using a UV exposure apparatus. The substrate was immersed in a developer comprising an aqueous solution of tetramethylammonium hydroxide after the exposure to develop the color layer. The substrate was heat-treated in an oven at 240° C. for 30 minutes to obtain the blue pixel. The thickness of the transmission area at the center of the pixel was 1.1 μm, and the chromaticity coordinate (x, y) measured under the standard light source C was (0.146, 0.178). The difference of chromaticity δ between the reflection area and transmission area is shown in Table 2. The chromaticity of the reflection area under the standard light source D65, and the chromaticity of the transmission area under the dual wavelength LED light source are shown in Table 7.

TABLE 7

(EXAMPLE 6)

| | CHROMATICITY OF TRANSMISSION AREA (DUAL WAVELENGTH LED LIGHT SOURCE) | | | | | CHROMATICITY OF REFLECTION AREA (STANDARD LIGHT SOURCE D65) | | | |
|---|---|---|---|---|---|---|---|---|---|
| | x | y | z | COLOR REPRODUCIBLE RANGE | | x | y | z | COLOR REPRODUCIBLE RANGE |
| R | 0.536 | 0.329 | 31.7 | 31% | R | 0.534 | 0.328 | 27.6 | 33% |
| G | 0.332 | 0.502 | 66.7 | | G | 0.291 | 0.497 | 58.8 | |
| B | 0.147 | 0.172 | 23.0 | | B | 0.137 | 0.169 | 20.4 | |
| W | 0.318 | 0.334 | 40.5 | | W | 0.297 | 0.331 | 35.6 | |

Comparative Example 7

A color filter was manufactured by the same method as in Example 1, except that no transparent area was formed in the reflection area of the red, green and blue pixels. The difference of chromaticity δ between the reflection area and transmission area of the color filter obtained is shown in Table 2. The chromaticity of the reflection area under the standard light source D65, and the chromaticity of the transmission area under the dual wavelength LED light source are shown in Table 8.

Comparative Example 8

A color layer formed of the red paste RPI-1 was deposited in the transmission area, and a color layer formed of the red paste PRI-5 was deposited in the reflection area by the same manufacturing steps as in Example 1. A color layer formed of the green paste GPI-1 was deposited in the transmission area, and a color layer formed of the green paste GPI-2 was deposited in the reflection area. A color layer formed of the blue paste BPI-1 was deposited in the transmission area, and a color layer formed of the blue paste BPI-2 was deposited in the reflection area. The color layer of each pixel had the same thickness of 1.1 μm in both the reflection area and transmission area. The chromaticity coordinates (x, y) of the reflection areas in the red, green and blue pixels measured under the standard light source C were (0.441, 0.293), (0.328, 0.421) and (0.185, 0.223), respectively. The chromaticity of the reflection area under the standard light source D65, and the chromaticity of the transmission area under the dual wavelength LED light source are shown in Table 9.

TABLE 8

(COMPARATIVE EXAMPLE 7)

| | CHROMATICITY OF TRANSMISSION AREA (DUAL WAVELENGTH LED LIGHT SOURCE) | | | | | CHROMATICITY OF REFLECTION AREA (STANDARD LIGHT SOURCE D65) | | | |
|---|---|---|---|---|---|---|---|---|---|
| | x | y | z | COLOR REPRODUCIBLE RANGE | | x | y | z | COLOR REPRODUCIBLE RANGE |
| R | 0.536 | 0.329 | 31.7 | 31% | R | 0.617 | 0.328 | 21.9 | 61% |
| G | 0.332 | 0.502 | 66.7 | | G | 0.278 | 0.592 | 52.6 | |
| B | 0.147 | 0.172 | 23.0 | | B | 0.133 | 0.140 | 15.4 | |
| W | 0.318 | 0.334 | 40.5 | | W | 0.303 | 0.339 | 29.9 | |

TABLE 9

(COMPARATIVE EXAMPLE 8)

| | CHROMATICITY OF TRANSMISSION AREA (DUAL WAVELENGTH LED LIGHT SOURCE) | | | | | CHROMATICITY OF REFLECTION AREA (STANDARD LIGHT SOURCE D65) | | | |
|---|---|---|---|---|---|---|---|---|---|
| | x | y | z | COLOR REPRODUCIBLE RANGE | | x | y | z | COLOR REPRODUCIBLE RANGE |
| R | 0.536 | 0.329 | 31.7 | 31% | R | 0.534 | 0.323 | 30.8 | 32% |
| G | 0.332 | 0.502 | 66.7 | | G | 0.326 | 0.502 | 75.0 | |
| B | 0.147 | 0.172 | 23.0 | | B | 0.146 | 0.179 | 23.3 | |
| W | 0.318 | 0.334 | 40.5 | | W | 0.316 | 0.344 | 43.0 | |

A color filter having small differences of brightness and chromaticity between the transmission area and reflection area was obtained in Example 4 as in Examples 1 and 2. The white level in the reflection display of the liquid crystal display manufactured using the color filter in Example 4 was brighter than those in Examples 1 to 3 with good viewing. Further more, only one more step was necessary for manufacturing the color filter in Example 4 as compared with the conventional color filters. It may be concluded that a quite excellent color filter could be obtained in Example 4.

Color filters having small differences of brightness and chromaticity between the transmission area and reflection area were obtained in Examples 5 and 6 as in Examples 1 and 2. The white levels of the liquid crystal displays manufactured using the color filters in Examples 5 and 6 were brighter than those in Examples 1 to 3 with more natural white color tone, showing good viewing. Further more, only one more step was necessary for manufacturing the color filters in Examples 5 and 6 as compared with the conventional color filters. It may be concluded that quite excellent color filters could be obtained in Examples 5 and 6.

The differences of brightness and chromaticity between the transmission area and reflection area were large in the color filter in Comparative Example 7. Brightness in the reflection display was very low in the liquid crystal display manufactured using the color filter in Comparative example 7 with poor viewing.

The differences of brightness and chromaticity between the transmission area and reflection area were small in the color filter in Comparative Example 8 as in the color filters in Examples 1 and 2. However, six steps were required in the photolithographic process of the color layer, thereby increasing the manufacturing cost of the color filter.

The present invention provides a color filter having small differences of brightness and chromaticity between the transmission area and reflection area, and having a small surface step height, by forming a transparent area in the reflection area while suppressing the manufacturing steps from increasing to provide a cheap color filter.

What is claimed is:

1. A color filter comprising a color layer, the color layer comprising a transmission area and a reflection area in which at least one color pixel of red, green and blue pixels comprises a material of a same color, the reflection area comprising a transparent portion, the transparent portion comprising at least one sub-area, and a size of the sub-area is 20 μm² or more and 2,000 μm² or less, wherein the red pixel comprises C.I. pigment red 254 and the thickness of the color layer is in the range of 0.6 to 1.5 μm, the thickness being substantially uniform throughout the color layer; and projections disposed on the color filter, wherein the projections are formed within a screen and on a frame of the screen, wherein areas of the protections formed within the screen and formed on the frame of the screen are substantially the same.

2. The color filter according to claim 1, wherein the sub-area is formed in the shape of a circle, a square with a side length of 5 μm or more, or a rectangle with a shorter side length of 5 μm or more.

3. The color filter according to claim 1, wherein the distance from the side of a sub-area to the side of a sub-area adjoining thereto is 10 μm or more.

4. The color filter according to claim 1, wherein the color filter further comprises an overcoat layer coated thereon.

5. The color filter according to claim 1, wherein the step height between the color area and transparent area in the reflection area is 0.5 μm or less.

6. The color filter according to claim 1, wherein a transparent resin layer is inserted between the substrate and color layer in the reflection area, and comprises at least one color pixel in which the thickness of the color layer in the reflection area is different from the thickness of the color layer in the transmission area.

7. The color filter according to claim 1, comprising at least one color pixel comprising different color layers in the transmission area and reflection area.

8. The color filter according to claim 1, wherein the projections are on an uppermost layer of the color filter.

9. A liquid crystal display comprising the color filter according to claim 1.

10. The color filter according to claim 1, wherein the red pixel comprises a pigment containing a quinacridone derivative.

11. The color filter according to claim 10, wherein the pigment containing the quinacridone derivative is C.I. pigment red 209.

12. The color filter according to claim 1, wherein the screen is part of a liquid crystal display.

13. A color filter comprising a color layer, the color layer comprising a transmission area and a reflection area in which at least one color pixel of red, green and blue pixels comprises a material of a same color, the reflection area comprising a transparent portion, the transparent portion comprising at least one sub-area, and a size of the sub-area is 20 μm² or more and 2,000 μm² or less, wherein the red pixel comprises C.I. pigment red 254 and the thickness of the color layer is in the range of 0.6 to 1.5 μm, the thickness being substantially uniform throughout the color layer; and projections disposed on the color filter, wherein the projections are formed within a screen and on a frame of a the screen, wherein the difference of chromaticity δ between the chromaticity coordinate ($x_0$, $y_0$) of the transmission area and chromaticity coordinate (x, y) of the reflection area satisfies the following equation:

$$\delta=(x-x_0)^2+(y-y_0)^2 \leq 3\times10^{-3}.$$

14. A color filter comprising a transmission area and a reflection area, the color filter comprising at least one color pixel of red, green and blue pixels, the reflection area comprising a transparent area having no color layer, the transparent area comprising at least one sub-area, wherein a difference of chromaticity δ between the chromaticity coordinate ($x_0$, $y_0$) of the transmission area and chromaticity coordinate (x, y) of the reflection area satisfies the following equation:

$$\delta=(x-x_0)^2+(y-y_0)^2 \leq 3\times10^{-3}.$$

15. A color filter comprising a color layer, the color layer comprising a transmission area and a reflection area in which at least one color pixel of red, green and blue pixels comprises a material of a same color, the reflection area comprising a transparent portion, the transparent portion comprising at least one sub-area, and a size of the sub-area is 20 $\mu m^2$ or more and 2,000 $\mu m^2$ or less, wherein the red pixel comprises C.I. pigment red 254 and the thickness of the color layer is in the range of 0.6 to 1.5 μm, the thickness being substantially uniform throughout the color layer; and projections disposed on the color filter, wherein the projections are formed within a screen and on a frame of a the screen, wherein a chromaticity coordinate x of the transmission area of the red pixel in the chromaticity color coordinate system under standard light source C is in the range of 0.4<x<0.6.

* * * * *